3 Sheets—Sheet 1.

H. A. BIERLEY.

CASH REGISTER.

No. 11,319. Reissued Apr. 4, 1893.

ATTEST

J. Henry Kaiser

Harry E. Hay

INVENTOR.

Henry A. Bierley.

By H. M. Wade

Atty.

H. A. BIERLEY.

CASH REGISTER.

No. 11,319. Reissued Apr. 4, 1893.

ATTEST.

J. Henry Kaiser

Harry E. Hay

INVENTOR.

Henry A. Bierley

By J. M. Vale

Atty.

3 Sheets—Sheet 3.

H. A. BIERLEY.

CASH REGISTER.

No. 11,319. Reissued Apr. 4, 1893.

ATTEST.

J. Henry Kaiser.

Harry E. Hay.

INVENTOR.

Henry A. Bierley.

By D. M. Wale

Atty.

UNITED STATES PATENT OFFICE.

HENRY AUGEST BIERLEY, OF LEXINGTON, KENTUCKY, ASSIGNOR TO THE LEADER CASH REGISTER COMPANY, OF SAME PLACE.

CASH-REGISTER.

SPECIFICATION forming part of Reissued Letters Patent No. 11,319, dated April 4, 1893.

Original No. 473,723, dated April 26, 1892. Application for reissue filed February 13, 1893. Serial No. 462,207.

*To all whom it may concern:*

Be it known that I, HENRY AUGEST BIERLEY, a citizen of the United States, residing at Lexington, in the county of Fayette and State of Kentucky, have invented certain new and useful Improvements in Cash-Registers; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in cash-registers of that character described and illustrated in Letters Patent granted to me November 3, 1891, No. 462,615, in which a sealed cash drawer or receptacle is provided, inaccessible, except to authorized persons, and an unlocked change-drawer, and suitable shutters for opening and closing the cash-openings operated by depressing the indicating-key, which also register the amount of sales made and actuate display-plates for indicating the sales.

The present invention is designed as an improvement upon that set forth in the above patent, and relates more particularly to the registering devices and the means for actuating the display-plates which indicate the amount of a sale at the time it is made, although the device is improved in general, whereby it is rendered more efficient when in operation.

The invention consists in the novel construction and combination of parts hereinafter fully described and claimed.

Figure 1:
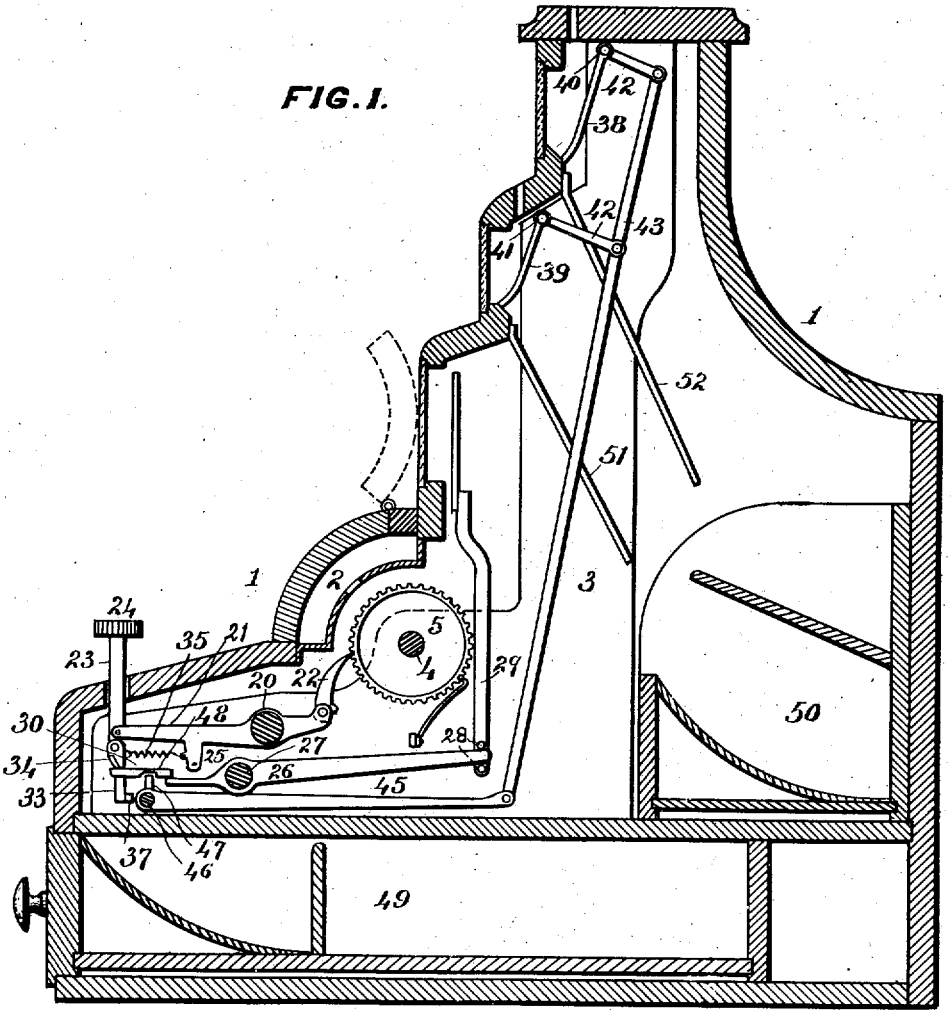
Figure 3:
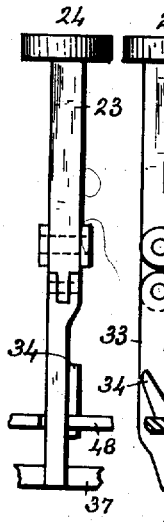
Figure 2:
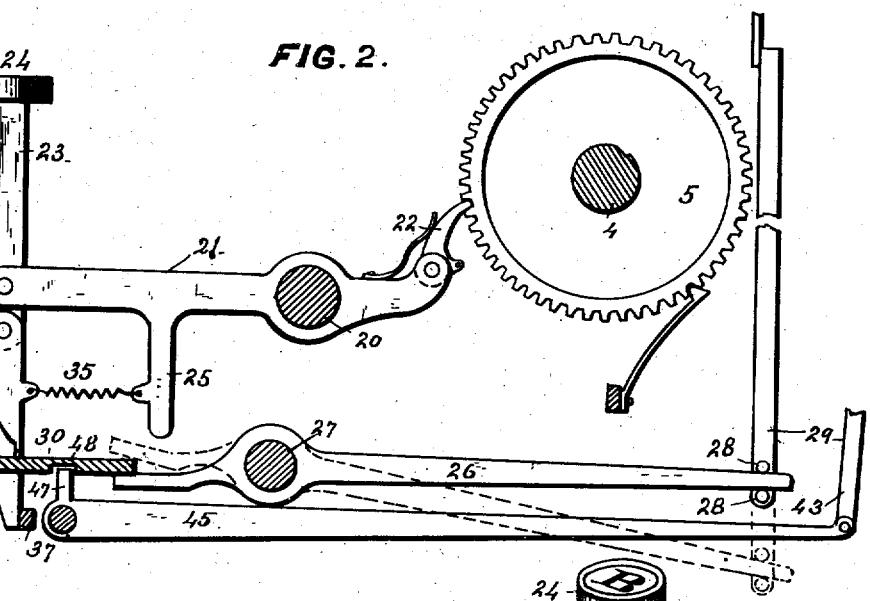
Figure 9:
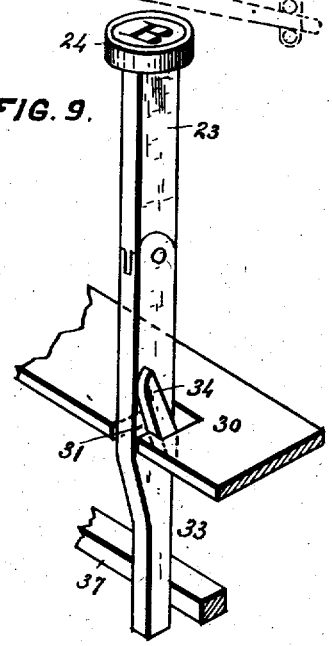
Figure 4:
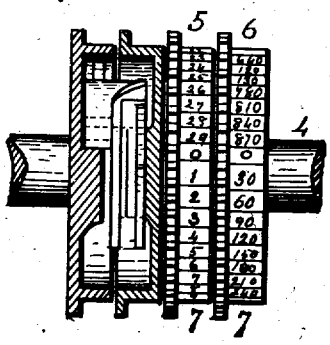
Figure 10:
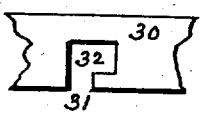
Figure 6:
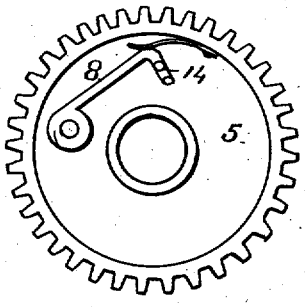
Figure 5:
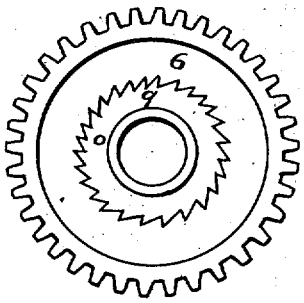
Figure 7:
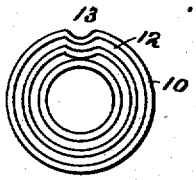
Figure 8:
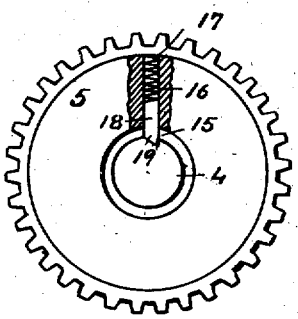

In the accompanying drawings, Figure 1 represents a central longitudinal section of a cash-register constructed in accordance with my invention. Fig. 2 is a side view, on an enlarged scale, of one of the indicating-keys and connections. Fig. 3 is a front view of the same. Fig. 4 is a view, partly in section and partly in elevation, of the registering-wheels. Figs. 5 and 6 are detail views of the same. Fig. 7 is a detail view of the disk connected with one of the registering-wheels. Fig. 8 is a side view of one of the registering-wheels, showing the spring-actuated catch. Fig. 9 is a detail perspective view of one of the indicating-keys. Fig. 10 is a plan view of a portion of the plate actuated by the indicating-keys to operate the display-plates.

In the said drawings the reference-numeral 1 designates the casing, which is substantially like that shown in my patent before referred to, with the exception that it has a sight-opening 2, through which the registering-wheels may be inspected.

The numeral 3 denotes a frame, in which is journaled a transverse shaft 4, which carries the registering devices, which consists of a primary wheel 5 and a secondary wheel 6, which are loose upon said shaft. The primary wheel 5 is formed with cogs on its periphery, and is also provided with an annular flange 7, on which is consecutively arranged a series of numbers running from "0" to "29" in the present instance. The secondary wheel is similarly formed; but the numbers thereon are arranged in multiples of thirty in regular arithmetical progression. The number and arrangement of the registering characters may be varied, depending to a great extent upon the size of the wheels. Pivoted to the inner face of the wheel 5 is a pawl 8, which is adapted to engage with a ratchet wheel 9, secured to or formed with wheel 6. Keyed to the shaft 4 is a disk 10, having a groove 12 in its face, with a depression 13, in which works a pin or stud 14 on the pawl 8. This disk is located intermediate of the wheels 5 and 6, with the groove therein facing the wheel 5. It will be understood that there is one wheel 5 and 6 and a disk for each registering-key, the object of the two wheels being to indicate the number of depressions of each key, so that the aggregate sales may be ascertained. It will also be noted that for each revolution of wheel 5 the secondary wheel 6 will be turned the extent of one number, as will hereinafter more fully appear.

The shaft 4 should be squared at one end to receive a wrench, and in order to enable all the wheels to be turned to zero at the beginning of a day's work the shaft 4 may be provided with a groove 15, extending from end to end thereof, which has one of its sides beveled or inclined at an angle to the axis. (See Fig. 8.) Secured to each of the wheels 5 and 6 is a small tube 16, containing a coiled spring 17 and a catch 18, having a beveled end 19 corresponding with groove 15. By this construction the wheels can turn freely on the shaft 4 in one direction, as the end of the catch will slide over the beveled side of the groove. The wheels, however, cannot turn in the opposite direction, so that when the shaft is rotated in that direction the catches will rotate the wheels so that they can all be turned back to zero.

Pivoted on a transverse shaft 20, secured to the frame of the device, are the key-levers 21, being provided at their inner ends with spring-actuated pawls 22, which engage with the cogs on the wheels 5 when a key is depressed, so as to move or rotate the wheels. The front or outer ends of the key-levers are pivoted to vertical bars 23, provided with finger-buttons 24. Intermediate of the key-bars 23 and the shaft 20 each lever is provided with a downwardly-depending arm 25, which is adapted to strike the end of a lever 26, pivoted on a transverse shaft 27. The opposite end of this lever engages with studs 28 on a vertical rod 29, which carries at its upper end a display-plate having a number thereon corresponding with the number on the finger-button of the key connected therewith. The numeral 30 denotes a transverse plate, the ends of which work in grooves in the frame or in the casing 1. At regular intervals throughout its length this plate is formed with a rectangular aperture 31 and an intersecting slot 32. Pivoted to the lower ends of the key-bars are bars 33, having upon one side cams 34, which engage with the aperture in the plate 30, while the edges of the bars rest in the slots 32. Springs 35 are connected with downwardly-depending arms 25 and with the pivoted bars 33, the tendency of which is to force the said pivoted arms 33 and consequently the plate 30 inwardly.

The numeral 37 denotes a transverse plate secured to the frame of the device for limiting the forward movement of the bars 33.

The cash-openings, which are similar to those in my patent before referred to, are provided with transverse shutters 38 and 39, secured to shafts 40 and 41, pivoted in the frame of the apparatus at the top of the casing so as to form chambers without openings from the top and rear except through the slot. These shafts are provided with cranks 42, pivoted to a vertical bar 43, which in turn is pivoted to a longitudinal lever 45, pivoted or fulcrumed on a transverse shaft 46 and provided with a short vertical arm 47, which engages with a notch 48 in the plate 30. The septums 51 and 52 serve as guides for the cash in its deposit by gravity within the till.

The numeral 49 denotes the change-drawer, which may readily be moved in and out, and 50 designates the sealed or locked cash till or receptacle located within the casing above the change-drawer.

The operation is as follows: When a cash payment is made and a key depressed to register the same, the pivoted pawls on the ends of the connected key-lever will move the wheel 5 the extent of one number, thus indicating that one sale equal in value to the amount on the finger-button of the key has been made. At the same time the arm 25 will strike the end of lever 26 and elevating the opposite end thereof, will cause the display-plate to be also elevated. As the arm strikes the lever 26 the plate 30 will be moved outward by the cam 34 engaging with the aperture 31, whereby the end of the lever can clear said plate. As the key-bar continues its movement the cam will become disengaged from the aperture, so as to allow the said plate to return to normal position, being forced inward by the spring 35 and pivoted bar 33, when it will engage with the lever 26 and keep the display-plate elevated until another key is depressed to register another sale. As these movements take place the short arm 47 of lever 45 will be actuated by the plate 30, and by means of the bar and cranks the shutters will be opened to allow the cash previously deposited in the cash-openings to drop to the cash-till. Upon the return movement of the plate the shutters will be closed to receive and retain the cash just received, which will remain in sight until a subsequent sale is made and the shutters again actuated by depressing a key to register such sale. When the wheel has made a complete revolution, the pin on the pawl 8 will engage with the depressed portion 13 of the groove 15, causing the pawl to be engaged with the ratchet 9, whereby the wheel 6 is moved one tooth or point, thereby indicating that thirty sales have been registered by wheel 5. The registering-wheels are returned to zero by means of the catches 18 and groove 15 in the shaft 4, as before described.

Having thus described my invention, what I claim is—

1. In a cash-register, the combination, with the registering-wheels, of the pivoted key-levers having spring-pawls at their inner ends, the key-bars, the downwardly-depending arms formed with said levers, the bars pivoted to the key-bars, provided with cams, the transverse plate having a rectangular aperture and an intersecting slot, the levers with which said plate and arms are adapted to engage, and the rods carrying the display-plates, substantially as described.

2. In a cash-register, the combination, with the casing provided with cash-openings and the shutters secured to pivoted transverse shafts provided with cranks, of the vertical bar connected with said cranks, the lever pivoted to said bar and fulcrumed to a transverse shaft, and the short vertical arm engaging with a notch in the sliding plate, actuated by the indicating-keys, substantially as described.

3. In a cash-register, the combination, of chambers for the reception of cash through openings in the outer casing, the rear walls of the chambers being formed by shutters pivoted in the frame at the top of the casings mediately connected with and actuated by registering-keys, septums leading from the chambers to the cash-till, and a cash-till, substantially as described.

4. In a cash-register, in combination the registering-keys, the pivoted bar carrying a cam engaging with a notch through the sliding plate actuated by the registering-keys, the sliding plate, the lever fulcrumed upon a transverse shaft having its inner end terminating in an upward projection which engages with a notch in the under side of the sliding plate, the vertical bar pivoted at the outer end of the lever, the shutters connected with and immediately actuated by the vertical bar, septums leading to the cash-till and the cash-till, substantially as described.

5. In a cash-registering apparatus, the combination of chambers for the reception of cash through openings in the outer casing, the rear wall of the chambers being formed by shutters mediately connected with a sliding plate, the sliding plate, registering-keys connected with bars having cams engaging in a notch in the sliding plate to actuate the same, septums leading from the chambers to the cash-till and a cash-till, substantially as described.

In testimony whereof I affix my signature in the presence of two witnesses.

HENRY AUGEST BIERLEY.

Witnesses:
J. E. LAUCK,
J. WOOD BROWNING.